United States Patent [19]

Pellhammer

[11] Patent Number: 4,650,125
[45] Date of Patent: Mar. 17, 1987

[54] METHOD FOR SORTING FIBER STOCK, ESPECIALLY FOR MANUFACTURING PAPER, AND SORTING APPARATUS FOR THE PERFORMANCE OF SUCH METHOD

[75] Inventor: Maurus Pellhammer, Ravensburg, Fed. Rep. of Germany

[73] Assignee: Escher Wyss GmbH, Ravensburg/Württ., Fed. Rep. of Germany

[21] Appl. No.: 540,888

[22] Filed: Oct. 11, 1983

[30] Foreign Application Priority Data

Oct. 15, 1982 [CH] Switzerland .................. 6017/82

[51] Int. Cl.⁴ .................................. B02C 23/36
[52] U.S. Cl. .................................. 241/21; 162/4; 209/284; 209/300; 241/24; 241/46.17; 241/74
[58] Field of Search .............. 209/254, 281, 283, 284, 209/300, 385, 389, 240, 243, 244; 241/73, 74, 28, 24, 46 R, 46.11, 46.17, DIG. 38, 21; 162/4

[56] References Cited

U.S. PATENT DOCUMENTS

| | | |
|---|---|---|
| 1,747,545 | 2/1930 | Haskell .................. 241/73 X |
| 1,751,009 | 3/1930 | Liggett .................. 241/73 |
| 1,768,713 | 7/1930 | Prater .................. 241/73 |
| 2,340,720 | 2/1944 | Wells .................. 241/73 X |
| 2,760,234 | 8/1956 | Freeman . |
| 2,943,800 | 7/1960 | Wultsch .................. 241/73 X |
| 4,076,177 | 2/1978 | Hirayama et al. .................. 241/73 X |
| 4,236,676 | 12/1980 | Bialski et al. .................. 241/74 |
| 4,339,085 | 7/1982 | Williams .................. 241/73 X |

FOREIGN PATENT DOCUMENTS 708660 5/1954 United Kingdom .

Primary Examiner—Mark Rosenbaum
Attorney, Agent, or Firm—Werner W. Kleeman

[57] ABSTRACT

The sorting apparatus contains a rotor equipped with blades or vanes which move along a screen or sieve located beneath the rotor. The screen forms a partial surface of a body of revolution, such as a partial surface or section of a cylinder. The fiber stock mass which has not moved through the screen is upwardly propelled into a turbulence chamber or space by the action of the rotor and again falls back onto such rotor or another rotor. A domed guide surface serves to guide the fiber stock mass.

31 Claims, 11 Drawing Figures

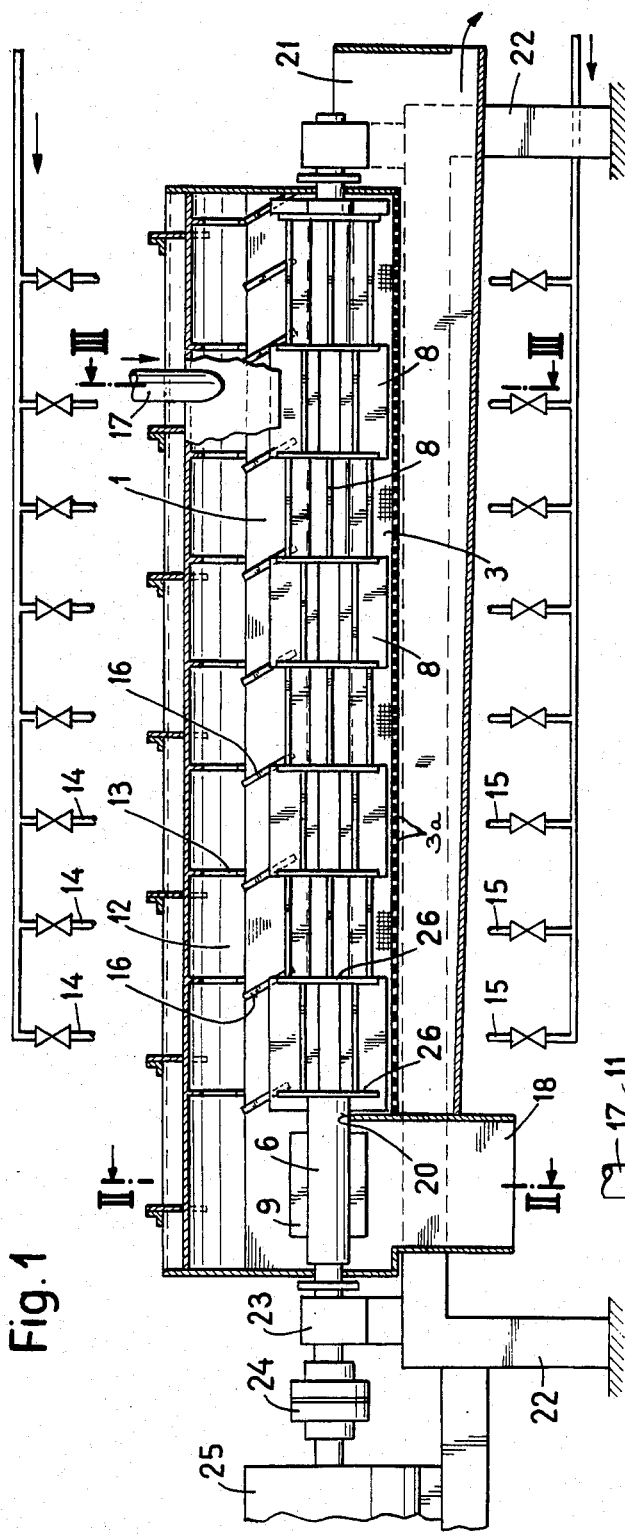
Fig. 1
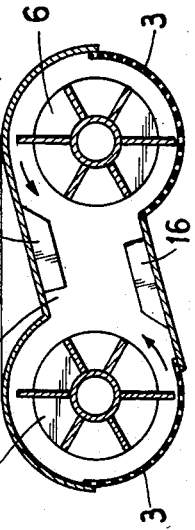
Fig. 10
Fig. 11
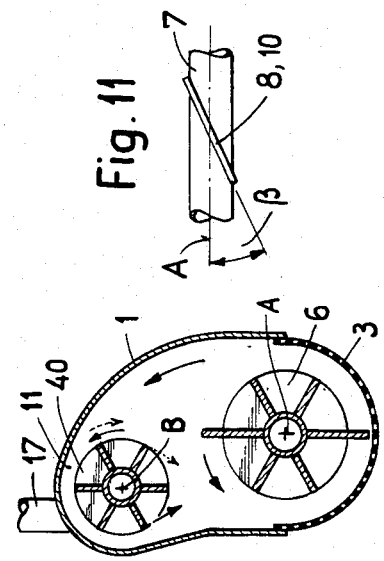
Fig. 9

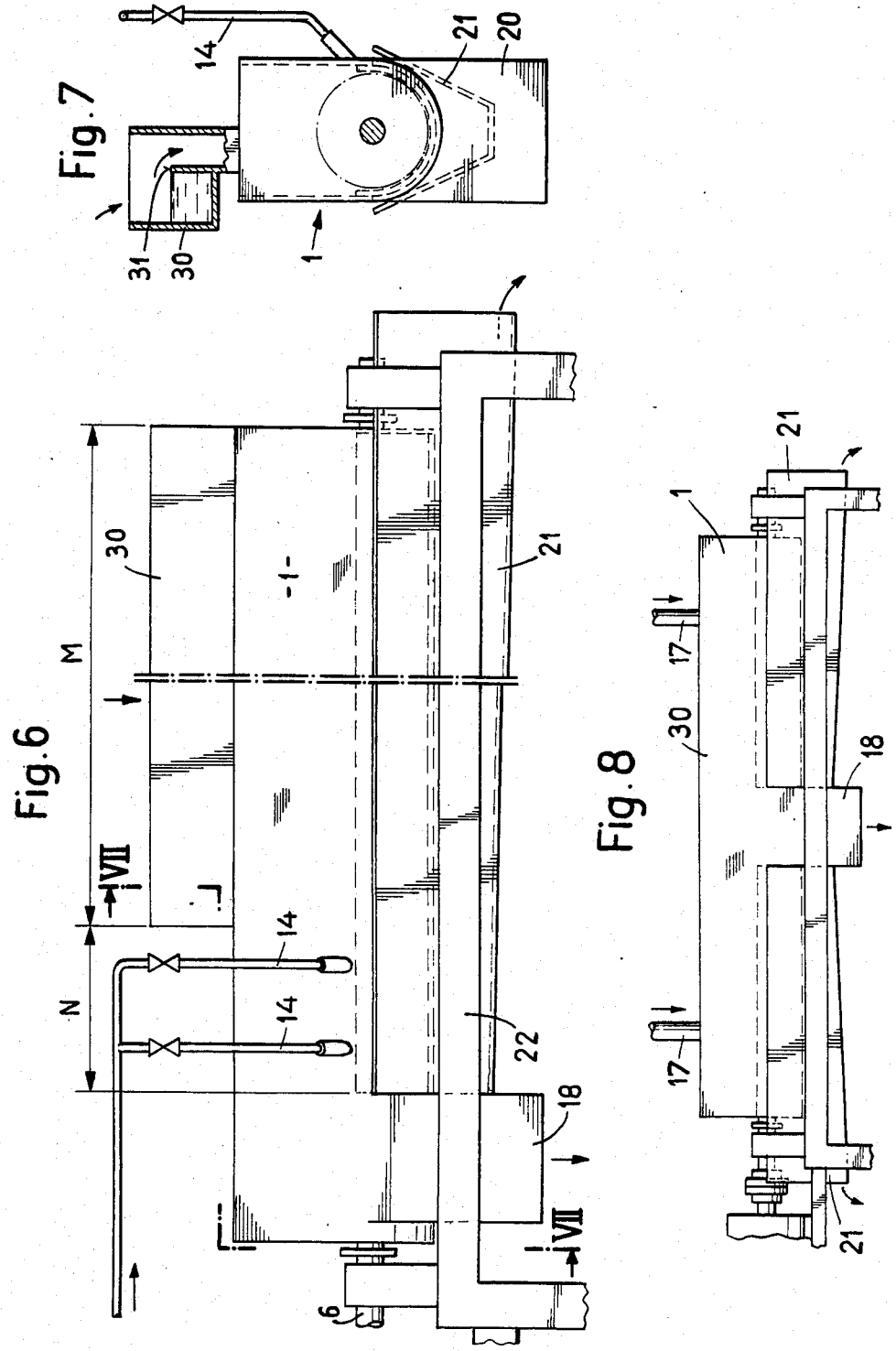

4,650,125

METHOD FOR SORTING FIBER STOCK, ESPECIALLY FOR MANUFACTURING PAPER, AND SORTING APPARATUS FOR THE PERFORMANCE OF SUCH METHOD

BACKGROUND OF THE INVENTION

The present invention relates to a new and improved method of, and apparatus for, sorting fiber stock, especially for the fabrication of paper, wherein the fiber stock together with a liquid is moved by a rotor located within a housing or container, the throughput or throughpassing fiber stock being withdrawn from the housing through a screen or sieve.

As concerns the sorting apparatus of the present development, which is suitable for the performance of the method aspects, such embodies a housing or container equipped with a screen or sieve and a rotor operatively associated with such screen or sieve. This rotor is provided with blades or vanes which move along or over the screen.

There are known in this technology many different constructions of sorting apparatuses which function according to such general method aspects, and, for instance, serve for reclaiming fiber stock obtained from waste paper and for separation of surface-like or areal contaminats, such as, for instance, plastic foils, from the mass of waste paper. U.S. Pat. No. 3,942,728, granted Mar. 9, 1976 is illustrative of one such type of sorting apparatus or stock pulper.

SUMMARY OF THE INVENTION

It is a primary object of the present invention to provide a new and improved method of, and apparatus for, sorting fiber stock, especially for the fabrication of paper, which in contrast to the heretofore known equipment possesses a spate of advantages.

Another and more specific object of the present invention aims at providing an improved method of, and apparatus for, sorting fiber stock in a most simple manner, with very modest energy requirements, within a pressureless, and thus, relatively inexpensive housing or container, wherein pieces of foils or the like contained in the fiber stock mass are only slightly comminuted if at all and can be effectively separated.

Yet a further important object of the present invention is concerned with an improved fiber stock sorting method and apparatus which is equally beneficially useful for the processing of fiber stock obtained from waste paper and intended for the fabrication of new paper, as well as for the fiberizing and sorting or fractionating of new fiber stock.

Now in order to implement these and still further objects of the invention, which will become more readily apparent as the description proceeds, the inventive method is manifested by the features that the fiber stock is propelled by the action of the rotational movement of the rotor out of the region of the rotor and transferred into an air chamber or space forming a turbulence chamber which is located externally of the region of the rotor. Thereafter, such fiber stock again arrives at the region of the same rotor or another rotor, by means of which the fiber stock is again propelled away.

As alluded to above the invention is not only concerned with the aforementioned method aspects, but concerns an improved construction of sorting apparatus for the performance thereof. Generally speaking, the sorting apparatus of the present development is manifested by the features that the housing together with the screen or sieve possesses the shape of a vat or trough at the lower region of which the screen or sieve forms a partial surface of a body of revolution. This body of revolution has a substantially horizontal or inclined axis and is arranged at the region of the lengthwise axis of the shaft of a rotor equipped with at least one blade or vane. This blade or vane extends close to the region of the screen or sieve and serves to clear or clean such screen. Externally of the region of the rotor there is arranged an air chamber or space forming a turbulence chamber. The mass containing the fibers can be propelled by the rotor into such turbulence chamber or space, and thus can be subjected to intensive turbulence or agitation within such turbulence chamber.

Regarding both the inventive method and sorting apparatus both have common thereto the feature that the fiber stock mass is propelled away by a rotor and subjected to intensive turbulence or agitation. During such time as the fiber stock mass is intensively agitated the fibers which have been released or de-fiberized from the fiber stock mass are simultaneously withdrawn through the screen or sieve and form the throughput or throughpassing stock, in this case the so-called good stock. Parts which have not been de-fiberized or dissolved and which are contained, for instance, in waste paper, are eliminated.

According to a relatively simple embodiment of the method the fiber stock is upwardly or elevationally propelled by the rotor and again drops back on to the same rotor, and the throughput stock is withdrawn through the screen or sieve beneath the rotor.

However, it is also possible for the fiber stock to be propelled by another rotor back onto the first-mentioned rotor.

With the sorting apparatus of the present development it is possible for the rotor to contain, apart from the mentioned blades or vanes which serve for clearing or cleaning the screen, also shorter blades or vanes which serve to propel the mass of the fiber stock. In principle, the clearing or cleaning blades also can undertake the task of propelling the mass of the fiber stock. However, it has been found that shorter blades or vanes which move in spaced relationship from the screen or sieve, propel the mass at a steeper angle against the screen or sieve, something which is beneficial for the sorting or classifying operation.

The blades or vanes, and specifically the clearing blades or vanes, as well as also the propelling blades or vanes, can extend perpendicular to their direction of movement. In this case other means must be provided to ensure for the axial movement of the fiber stock mass within the equipment, for instance the housing could be arranged at an inclination to achieve this effect.

However, it also would be possible for at least one of the blades or vanes to be inclined with respect to the direction of movement in such a manner that it brings about a movement or conveying of the fiber stock mass in the axial direction of the rotor.

According to a preferred embodiment a deflection element providing a deflection surface can be arranged above the rotor. This deflection surface serves to deflect the fiber stock mass propelled away from the rotor back into the axial region of the rotor. Due to this measure the motion of the agitated mass is deflected in such a manner that it can be propelled at a favorable angle against the screen or sieve.

For this purpose the deflection surface can be domed or arched in the direction of movement of the fiber stock mass, and such deflection surface can be equipped with guide ribs or ledge members for such fiber stock mass.

Preferably, at the ejection side of the rotor there can be arranged for movement adjustable guide ribs or ledges. These adjustable guide ribs, depending upon their angle of attack or adjustment angle with regard to the direction of movement of the fiber stock mass, can cause or promote movement of such fiber stock mass in the axial direction of the rotor. By adjusting such guide ribs or ledges there can be beneficially controlled the throughput velocity of the fiber stock mass through the equipment.

Discharge openings or apertures for water can be distributively arranged at the housing or container in the lengthwise direction of extent thereof. In this manner the fiber stock mass which is contained within the equipment can be flushed and diluted.

For the same purpose the shaft of the rotor can be constructed to be hollow and connected with an infeed line or conduit for water. In this case the hollow rotor shaft is provided with discharge or outlet openings for the water flowing through such hollow shaft.

According to a further embodiment of the invention a further rotor can be located within the housing. The lengthwise axis of this further rotor can extend essentially parallel to the lengthwise axis of the first rotor.

This further rotor can be advantageously located in the air or turbulence chamber or space. Due to these measures there is obtained a particularly intensive agitation and processing of the fiber stock mass.

In all of the aforementioned constructional embodiments it is possible for the housing or container to also be provided with an infeed vat or trough having an overflow edge or weir. This infeed vat is arranged above the housing containing the rotor and extends essentially parallel to its lengthwise axis. In this way there is desirably obtained a uniform distribution of the infed materials along the length or axial extent of the equipment, whether such infed materials are constituted by the water together with the fiber stock mass or simply the water alone.

Moreover, the infeed vat or trough can extend over more than one half of the axial extent of the housing. When processing inputted fiber stock masses of lower stock density it is possible to thus obtain a flushing thereof with a suitable liquid, typically water, and the infeed of additional water only then is required in a subsequent section of the equipment.

BRIEF DESCRIPTION OF THE DRAWINGS

The invention will be better understood and objects other than those set forth above, will become apparent when consideration is give to the following detailed description thereof. Such description makes reference to the annexed drawings wherein throughout the drawings there have been generally used the same reference characters to denote the same or analogous components, and wherein:

FIG. 1 is a schematic longitudinal sectional view through an exemplary embodiment of sorting apparatus useful for the performance of the inventive method;

FIG. 6 is a front view of a different embodiment of sorting apparatus and analogous to the showing of FIG. 1;

FIG. 7 is an end and partially sectional view of the arrangement of FIG. 6, taken substantially along the line VII—VII thereof;

FIG. 8 illustrates a modified construction of the sorting apparatus depicted in FIG. 6;

FIGS. 9 and 10 respectively depict two schematic sectional views portraying two further constructions of the inventive sorting apparatus; and FIG. 11 is a schematic illustration of one of the blades or vanes which is positioned at an inclination with respect to its direction of movement.

DETAILED DESCRIPTION OF THE PREFERRED EMBODIMENTS

Figure 2:
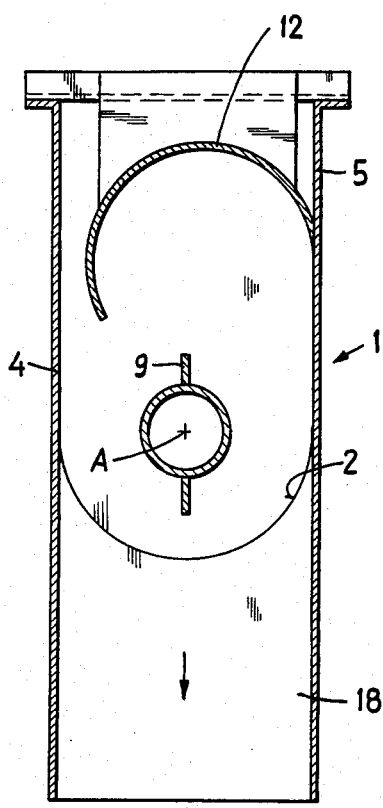
FIG. 2 is a cross-sectional view, on an enlarged scale, taken substantially along the line II—II of the arrangement of FIG. 1.

Describing now the drawings, it is to be understood that only enough of the construction of the sorting apparatus of the present development has been shown therein so as to enable those skilled in the art to readily understand the underlying principles and concepts of the present development, while simplifying the showing of the drawings. Turning attention now to such drawings, the exemplary embodiment of sorting apparatus depicted in FIGS. 1 to 3 will be seen to comprise a housing or container 1 possessing the shape of a vat or trough. This housing or container 1 is provided with a partial surface 2 of a cylinder possessing a lengthwise or cylinder axis A which may be substantially horizontal or inclined. In the embodiment under discussion the partial surface 2 is defined by essentially a semi-cylinder and is formed by a screen or sieve 3. Merging with this partial cylinder surface 2 are vertical walls 4 and 5 which in conjunction with the screen or sieve 3 form the vat or trough 1a of the housing 1. Arranged coaxially to the cylinder or lengthwise axis A of the screen or sieve 3 is a rotor 6 which is equipped with a hollow shaft 7 as well as blades or vanes 8, 9 and 10. The blades or vanes 8 extend in close proximity to the screen or sieve 3 and serve for clearing or cleaning the screen 3 during rotational movement of the rotor 6 about its lengthwise axis which is the same as the cylinder or lengthwise axis of the housing 1 and its screen 3. The blades 8 define a surface of revolution of the rotor 6. Arranged above the surface of revolution defined by the blades 8 of the rotor 6 is an air chamber or space serving as a turbulence chamber 11 and which is closed at its top or upper region by a deflection element 12 defining a deflection or guide surface. In the illustrated exemplary embodiment the deflection surface 12 is domed or arched in such a manner that the fiber stock mass which is elevationally or upwardly propelled by the action of the rotor 6 and sliding along such deflection surface 12 can again slide back towards the region of the lengthwise axis A of the rotor 6.

Figure 3:
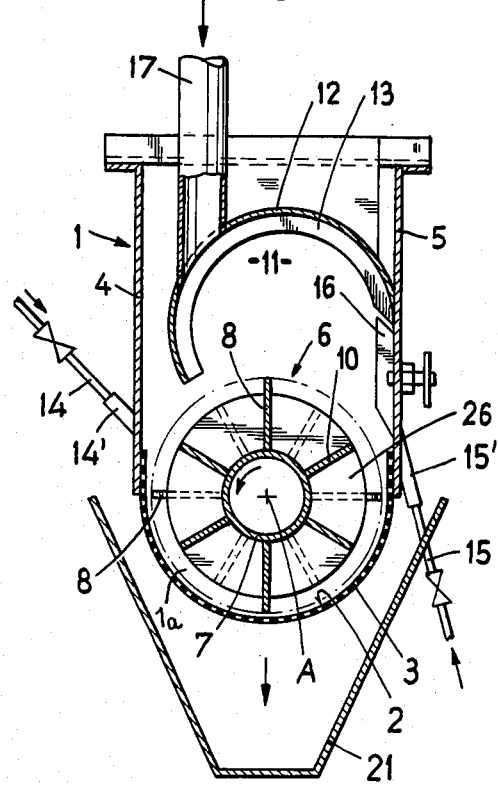
FIG. 3 is a corresponding cross-sectional view of the arrangement of FIG. 1, taken substantially along the line III—III thereof.

As will be apparent by reverting to FIGS. 1 and 3, the deflection surface 12 is equipped with guide rib or ledge members 13 for the fiber stock mass which is propelled away from the rotor 6. These guide rib members 13, in the illustrated exemplary embodiment, are situated in planes which are disposed essentially perpendicular to the lengthwise axis A of the rotor 6. However, these guide rib members 13 also could be arranged at an inclination, i.e., in a helical or screw-line configuration, in order to thereby augment the movement of the fiber stock mass in a desired direction, for instance towards the outlet for the stock which is to be separated out of the housing 1.

As will be particularly apparent by inspecting FIG. 3, the housing 1 is equipped with infeed lines or conduits 14 and 15 for the infeed of water. Nozzles 14' and 15', defining discharge openings, extend from such water infeed lines 14 and 15, respectively, into the internal space of the housing 1. At the ejection or output side of the rotor 6, which is governed by its direction of rotation as represented for instance by the not particularly referenced arrow of FIG. 3, there is located within the housing 1 at the vertical wall 5 a series of adjustable guide ribs or ledge members 16. In the illustration of FIG. 1 these guide ribs or ledge members 16 can be inclined with respect to the axial direction of the rotor 6. Such guide ribs or ledge members 16 influence the movement of the fiber stock mass in the axial direction of the rotor 6.

As shown in FIGS. 1 and 3, an infeed conduit or pipe 17 is provided for the infeed of the fiber stock mass which is to be sorted or classified. This infeed conduit 17 piercingly extends through the deflection or guide surface 12. At the left-hand end of the illustration of FIG. 1 the sorting apparatus is provided with an outlet shaft or chute 18 or equivalent structure for the overflow stock which has not passed through the screen or sieve 3. Between the screen 3 and the outlet or discharge shaft 18 there is located an overflow section or edge 20.

Arranged beneath the housing 1 is a collecting or catch container 21 for the throughput stock which has passed through the screen or sieve 3. Both the collecting or catch container 21 and also the housing 1 are secured to a suitable support structure or framework 22 which simultaneously carries bearing blocks 23 for the rotor shaft 7. This rotor shaft 7 is operatively connected by means of a coupling 24 with a suitable drive motor 25. As also will be recognized from FIG. 1, the rotor 6 is equipped with substantially disk-shaped separation or partition walls 26 which are arranged essentially perpendicular to the lengthwise axis A of the rotor 6. These partition or separation walls 26 mutually separate from one another individual sections of the blades or vanes 8 and 10. Between the separation walls 26 the blades or vanes 8 and 10 are offset with respect to one another, as such will be apparent from the showing of FIG. 3. Consequently, there can be equalized the rotational moment or torque during driving of the rotatable rotor 6.

During operation of the equipment the rotor 6 is rotated by the action of the drive motor 25 at a relatively high rotational speed suitable for propelling the fiber stock mass. In the event that a partially pulped mass of waste paper is to be processed, then such is introduced, for instance from a conventional stock slusher or pulper, through the infeed line or conduit 17 into the housing 1. Due to the rotation of the rotor 6 this mass, which already contains de-fiberized paper fibers and also surface-like or substantially flat parts, such as lumps of paper, foil pieces and so forth as well as a proportion of water, is initially propelled against the screen or sieve 3, so that part of the fibers can pass through the screen 3 into the catch or collecting container 21. The part of the stock which has not passed through the screen 3 is acted upon by the clearing blades or vanes 8, elevationally propelled upwardly and slides along the deflection or guide surface 12 back again into the effective region of the rotor 6, whereupon this process repeats.

In this manner there is accomplished an extremely intensive agitation or placement of the mass into a state of turbulence, and such intensively agitated mass moves under the action of the adjustable guide ribs or ledges 16 towards the outlet or discharge shaft or chute 18. During such agitation and movement there are eliminated, on the one hand, free paper fibers through the screen or sieve 3 and not yet de-fiberized paper pieces are further de-fiberized. On the other hand, foil pieces or the like remain upon the screen 3 and are practically not further comminuted by the turbulent action. They finally arrive in the form of overflow stock at the outlet or discharge shaft 18.

In similar fashion it is possible to also process in such equipment cellulose or wood pulp for the fabrication of paper. In such case there is introduced into the housing or container 1 the fiber stock suspension which has been formed in the stock slusher or pulper. It is possible to eliminate contaminants, such as for instance wood fragments or shives as the overflow through the outlet shaft or chute 18. The fibers forming the throughput stock once again arrive at the collecting container or receptacle 21. However, the cellulose or wood pulp can also be fractionated or classified with the inventive equipment if the size of the holes or openings 3a of the screen 3 are appropriately selected. In this way shorter fibers can move in the form of throughput stock through the screen or sieve 3 into the collecting container 21, whereas the longer fibers can form the overflow stock and can move into the outlet shaft 18.

Figure 4:
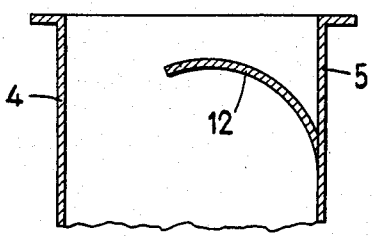
FIG. 4 is a fragmentary sectional view of part of the arrangement of FIG. 2, depicting a modified construction of a deflection element forming a deflection surface.
Figure 5:
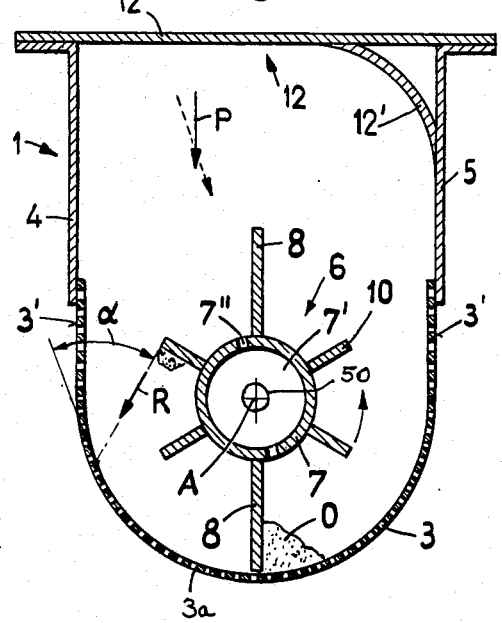
FIG. 5 is a cross-sectional view, analogous to the showing of FIG. 3, but depicting a different exemplary embodiment of equipment.

FIGS. 4 and 5 depict further possible exemplary embodiments of the deflection or guide surface 12. In the arrangement of FIG. 4 the deflection or guide surface 12 is structured to be appreciably shorter than the deflection or guide surface 12 of the arrangement of FIGS. 2 and 3. In this case there can be dispensed with the guide ribs or ledge members 13.

According to the modified version of FIG. 5, the deflection or guide surface 12 is formed by an arcuate-shaped insert 12' as well as by a flat or planar cover member 12". Under certain circumstances it is even possible to dispense with the use of the insert or insert member 12'.

Based upon the showing of FIG. 5 there will also be explained in greater detail the mode of operation of the sorting appartus.

The fiber stock mass is introduced into the housing or container 1 in the direction of the solid line or broken line depicted arrows P and arrives at the axial region of the rotor 6. Thereafter, the thus introduced fiber stock mass is acted upon by the blades or vanes 8 or 10 and propelled against the screen or sieve 3. Due to the infeed of the fiber stock mass to the axial region of the rotor 6 there is realized the possibility that the inputted mass can arrive between the blades or vanes 8 or 10, so that such fiber stock mass can be propelled by the shorter blades or vanes 10, serving for propelling of the mass, in the direction of the arrow R at a relatively steep angle α against the screen or sieve 3. As a result, there is thus augmented, on the one hand, the de-fiberizing of not yet completely de-fiberized paper fibers, and, on the other hand, there is also enhanced the penetration of the already de-fiberized paper fibers into and through the holes or openings 3a of the screen 3. The longer blades or vanes 8, while also participating in such propelling action, however perform their primary function of clearing or cleaning the screen or sieve 3, as such has been generally indicated by the paper mass O which has been displaced or pushed by the lower blade or vane 8 of the showing of FIG. 5.

With the embodiment of equipment as depicted in FIG. 6, which in all other respects essentially corresponds to the arrangement of FIGS. 1 to 3, the infeed conduit or pipe 17 is replaced by an infeed vat or trough 30. This infeed vat or trough 30 has an overflow section or edge 31 i.e. a weir, by means of which the processed mass drops into the housing 1.

As also will be evident from the illustration of FIG. 6, the infeed vat or trough 30 extends over a length M of the part of the housing 1 provided with the screen or sieve 3, and which length M of the infeed vat 30 is greater than one-half of the length of the housing 1. The remaining section N is provided with infeed lines or conduits 14 for water. With this arrangement the screening operation is accomplished in the section M only under the influence of the water contained in the inputted mass. When water is freshly infed from the lines or conduits 14 there is only flushed the overflow stock which then arrives at the outlet shaft or chute 18. It should be understood, however, that when inputting material having a higher stock density it would be possible to also arrange infeed lines for water at the section M of the equipment.

FIG. 8 depicts an exemplary embodiment of sorting apparatus containing a housing or container 1 which is essentially symmetrically constructed and centrally possesses an output shaft or chute 18. In corresponding manner there are provided two collecting or catch containers 21.

FIGS. 9 and 10 depict two possible exemplary embodiments of the sorting apparatus containing two rotors with essentially parallel axes. It is to be understood that in such FIGS. 9 and 10, and equally in the other FIGS. of the accompanying drawings, there have been generally used throughout the drawings the same reference characters to denote the same or analogous components.

With the embodiment of FIG. 9 a second rotor 40 is located within the housing 1 above the rotor 6. This second rotor 40 can be constructed similar to the rotor 6. This second rotor 40 serves for propelling back the fiber stock mass to the rotor 6 which initially was upwardly propelled by such rotor 6.

A similar action is achieved with the exemplary embodiment of sorting apparatus depicted in FIG. 10, wherein, however, two similar or identical rotors 6 are provided at the same elevational position, each of these rotors 6 cooperating with a respective screen or sieve 3.

Finally, FIG. 11 shows a possible arrangement of the blades or vanes 8 or 10 upon the rotor shaft 7 of the rotor 6. In this case the blades 8 or 10 are arranged at an angle with respect to the lengthwise axis A of the shaft 7. In this way there is augmented the transportation or conveying of the treated fiber stock mass in the axial direction of the housing 1 towards the outlet shaft or chute 18, so that it is possible, under circumstances, to dispense with the use of the adjustable guide ribs or ledge members 16. On the other hand, the blades or vanes 8 or 10 and the guide ribs or ledge members 16 can be structured and arranged to operate in opposing relationship with respect to one another, so that there can be retarded the axial movement of the mass within the equipment or there can be achieved an internal circulation movement.

Turning again at this point to FIG. 5 it will be recognized that there has been illustrated therein a further possibility for the infeed of water into the housing or container 1. Thus, the hollow space or region 7' of the shaft 7 of the rotor 6 can be connected with a not particularly illustrated water line or conduit which has merely been symbolically represented by reference character 50. The shaft 7 is then provided with discharge openings or bores 7" which permit the efflux of the water towards the outside.

It should be understood that the screen or sieve 3 or equivalent structure need not possess the shape of a semi-cylindrical surface, as such has been illustrated in several of the accompanying FIGS. of the drawings. As depicted in FIG. 5, it is possible for such screen 3 to also have a planar or flat section or portion 3' which merges with the cylindrical surface. On the other hand, the cylindrical surface formed by the screen 3 can be smaller than a semi-cylinder, as the same has been depicted, for instance, in FIG. 10. Finally, it is to be understood that the screen or sieve 3 need not be cylindrical in its shape, rather generally can possess the form of a body of revolution. Thus, for instance, it can be conical or can be composed of a number of cylindrical sections of different diameter.

It is possible to input to the sorting apparatus, separately from the water, fiber stock masses possessing a higher stock density. In such case, with the embodiments depicted in FIGS. 6 to 8 the vat or trough 30 can serve for the infeed of the water, whereas the fiber stock mass can be inputted separately, for instance through pipes comparable to the pipes or conduits 17.

While there are shown and described present preferred embodiments of the invention, it is to be distinctly understood that the invention is not limited thereto, but may be otherwise variously embodied and practiced within the scope of the following claims. Accordingly,

What I claim is:

1. A method of sorting contaminant-containing fiber stock suspension, especially for the fabrication of paper, comprising the steps of:

moving within a housing containing a rotor and a screen, the fiber stock suspension in conjunction with a liquid;

rotating the rotor and thereby defining a surface of revolution of said rotor;

during the step of rotating said rotor, propelling the liquid-containing fiber stock away from the surface of revolution defined by the rotor into an air space forming a turbulence chamber and located externally of the surface of revolution defined by the rotor;

thereafter returning the propelled-out liquid-containing fiber stock toward the rotor;

again propelling away the liquid-containing fiber stock from said surface of revolution defined by the rotor;

flushing-in water at least in a direction extending into said turbulence chamber;

during said step of moving said contaminant-containing fiber stock suspension within said housing, passing substantially contaminant-free good stock through said screen and thereby sorting said good stock from overflow stock essentially containing said contaminant;

during said step of moving said contaminant-containing fiber stock suspension within said housing, moving said overflow stock along said screen and essentially in an uncomminuting manner; and discharging said essentially uncomminuted overflow stock in an end region of said screen.

2. The method as defined in claim 1, wherein:

said step of rotating said rotor and propelling the liquid-containing fiber stock entails upwardly propelling the liquid-containing fiber stock from the surface of revolution of the rotor;

allowing such upwardly propelled liquid-containing fiber stock to fall back onto said rotor; and locating said screen below said rotor.

3. A method of sorting fiber stock, especially for the fabrication of paper, comprising the steps of:

moving within a housing containing a rotor and a screen, the fiber stock in conjunction with a liquid;

rotating the rotor and thereby defining a surface of revolution of said rotor;

during the step of rotating said rotor, propelling the liquid-containing fiber stock away from the surface of revolution defined by the rotor into an air space forming a turbulence chamber and located externally of the surface of revolution defined by the rotor;

thereafter returning the propelled-out liquid-containing fiber stock toward the rotor;

again propelling away the liquid containing fiber stock from said surface of revolution defined by the rotor;

flushing-in water at least in a direction extending into said turbulence chamber;

passing throughput stock through said screen and thereby removing said throughput stock from the housing; and propelling the liquid-containing fiber stock by means of a further rotor back to the same rotor.

4. A method for sorting a fiber stock suspension containing contaminants and intended for fabricating paper, especially a fiber stock suspension reclaimed from waste paper and containing substantially flat contaminants such as plastic foils, comprising the steps of:

passing the fiber stock suspension conjointly with water through a housing containing a screen;

agitating the water-laden fiber stock obtained while passing the fiber stock suspension through said housing without comminuting said substantially flat contaminants;

during said step of agitating the water-laden fiber stock, subjecting the water-laden fiber stock to a propelling motion directed away from said screen;

flushing-in water at least in a direction extending into said turbulence chamber;

redirecting the propelled-away water-laden fiber stock toward said screen;

during said step of passing said fiber stock suspension through said housing, sorting said fiber stock suspension by passing good stock through the screen and out of the housing and moving said essentially uncomminuted substantially flat contaminants contained in said fiber stock suspension along said screen;

receiving the good stock passed through said screen conjointly with the flushing water in a catchbox situated beneath said screen; and discharging said essentially uncomminuted substantially flat contaminants in an end region of said screen.

5. A method of sorting a contaminant-containing fiber stock suspension, especially for the fabrication of paper, comprising the steps of:

infeeding said contaminant-containing fiber stock suspension into a substantially trough-shaped housing containing a screen which extends along part of a surface of revolution about a predetermined axis, and a rotor extending substantially coaxially with said screen and containing a predetermined number of clearing blades and a predetermined number of propelling blades;

rotating said rotor while infeeding said contaminant-containing fiber stock suspension into said housing;

during said step of rotating said rotor, clearing said screen and propelling fiber stock from said screen into an air space by means of said clearing blades and which air space constitutes a turbulence chamber arranged in said housing outside a surface of revolution which is defined by said clearing blades of said rotor;

redirecting towards said rotor said fiber stock propelled into said turbulence chamber by said clearing blades;

during said step of rotating said rotor, receiving at least part of said fiber stock redirected to said rotor from said turbulence chamber by said propelling blades and propelling said received fiber stock by said propelling blades at a relatively steep propelling angle against said screen in order to thereby assist throughpassage of good stock through said screen;

sorting said infed fiber stock by moving said infed contaminant-containing fiber stock along said screen;

during said step of moving said infed contaminant-containing fiber stock along said screen, passing substantially contaminant-free good stock through said screen and thereby sorting said good stock from overflow stock essentially containing said contaminant;

during said step of moving said infed contaminant-containing fiber stock along said screen, moving said overflow stock along said screen and essentially in an uncomminuting manner; and discharging said essentially uncomminuted overflow stock in an end region of said screen.

6. The method as defined in claim 5, further including the steps of:

flushing-in water at least in a direction extending into said turbulence chamber; and during said step of passing said good stock through said screen, also passing said flushed-in water through said screen.

7. The method as defined in claim 5, wherein:

said step of redirecting said fiber stock propelled into said turbulence chamber, entails deflecting said fiber stock at a deflecting surface arranged in said turbulence chamber, in a direction towards an axial region of said rotor.

8. The method as defined in claim 7, further including the steps of:
arranging said turbulence chamber above said surface of revolution defined by said clearing blades of said rotor; and
said step of propelling said fiber stock by said clearing blades of said rotor includes upwardly propelling said fiber stock from said screen to said turbulence chamber arranged above said surface of revolution defined by said clearing blades of said rotor.

9. The method as defined in claim 5, wherein:
said step of moving said fiber stock along said screen includes guiding said fiber stock for movement in a substantially axial direction of said rotor.

10. The method as defined in claim 5, wherein:
said step of infeeding said fiber stock entails infeeding said fiber stock through an infeed vat extending substantially parallel to said rotor.

11. A method of sorting fiber stock, especially for the fabrication of paper, comprising the steps of:
infeeding said fiber stock into a substantially trough-shaped housing containing a screen which extends along part of a surface of revolution about a predetermined axis, and a rotor extending substantially coaxially with said screen and containing a predetermined number of clearing blades and a predetermined number of propelling blades;
rotating said rotor while infeeding said fiber stock into said housing;
during said step of rotating said rotor, clearing said screen and propelling fiber stock from said screen into an air space by means of said clearing blades and which air space constitutes a turbulence chamber arranged in said housing outside a surface of revolution which is defined by said clearing blades of said rotor;
redirecting towards said rotor said fiber stock propelled into said turbulence chamber by said clearing blades;
during said step of rotating said rotor, receiving at least part of said fiber stock redirected to said rotor from said turbulence chamber by said propelling blades and propelling said received fiber stock by said propelling blades at a relatively steep propelling angle against said screen in order to thereby assist throughpassage of good stock through said screen;
sorting said infed fiber stock by moving said infed fiber stock along said screen and thereby passing good stock through said screen and overflow stock to an outlet of said housing;
said step of redirecting said fiber stock propelled into said turbulence chamber, entailing the steps of:
receiving said fiber stock by a further rotor arranged in said turbulence space; and
propelling said received fiber stock back towards said rotor.

12. A method of sorting fiber stock, especially for the fabrication of paper, comprising the steps of:
infeeding said fiber stock into a substantially trough-shaped housing containing a screen which extends along part of a surface of revolution about a predetermined axis, and a rotor extending substantially coaxially with said screen and containing a predetermined number of clearing blades and a predetermined number of propelling blades;
rotating said rotor while infeeding said fiber stock into said housing;
during said step of rotating said rotor, clearing said screen and propelling fiber stock from said screen into an air space by means of said clearing blades and which air space constitutes a turbulence chamber arranged in said housing outside a surface of revolution which is defined by said clearing blades of said rotor;
redirecting towards said rotor said fiber stock propelled into said turbulence chamber by said clearing blades;
during said step of rotating said rotor, receiving at least part of said fiber stock redirected to said rotor from said turbulence chamber by said propelling blades and propelling said received fiber stock by said propelling blades at a relatively steep propelling angle against said screen in order to thereby assist throughpassage of good stock through said screen;
sorting said infed fiber stock by moving said infed fiber stock along said screen and thereby passing good stock through said screen and overflow stock to an outlet of said housing;
said step of infeeding said fiber stock entailing the step of infeeding fiber stock reclaimed from waste paper and containing substantially flat contaminants, especially pieces of plastic foil;
during said step of propelling said fiber stock received by said propeller blades towards said screen, passing at least part of said good stock through said screen and holding back at said screen said substantially flat contaminants in an essentially uncomminuted state; and
during said step of moving said fiber stock along said screen, passing the remaining portion of said good stock through said screen and said substantially flat contaminants in said essentially uncomminuted state as said overflow stock to said outlet of said housing.

13. A sorting apparatus for sorting contaminant-containing fiber stock, especially for the fabrication of paper, comprising:
a housing having an axis;
infeed means for infeeding into said housing a water-containing and contaminant-containing suspension of said fiber stock;
a screen provided for said housing;
a rotor arranged within said housing and defining a surface of revolution;
said rotor being provided with at least one blade which coactingly cooperates with said screen;
said housing together with said screen defining a vat having a lower region;
said screen forming a partial surface of a body of revolution which defines an axis, and said screen being arranged at said lower region of said vat;
said rotor being provided with a shaft at the region of said axis of said body of revolution;
a catchbox for passed good stock and water situated beneath said screen;
an end region provided with discharge means for discharging substantially uncomminuted overflow stock essentially containing said contaminant;

said at least one blade of said rotor extending in close proximity to said screen and serving for clearing said screen of water-laden fiber stock located thereon;

said housing being provided with an air space forming a turbulence chamber located externally of the surface of revolution defined by the rotor;

said rotor during operation of the sorting apparatus propelling said water-laden contaminant-containing fiber stock into said turbulence chamber and thereby intensively agitating said water-laden and contaminant-containing fiber stock without substantially comminuting said contaminant; and means for flushing-in water at least in a direction extending into said chamber and which means extend along said screen.

14. The sorting apparatus as defined in claim 13, further including:

means defining a deflecting surface arranged in said turbulence chamber outside said surface of revolution defined by said rotor;

said deflecting surface receiving said water-laden fiber stock propelled by said rotor into said turbulence chamber;

said rotor defining an axial rotor region; and said deflecting surface deflecting the water-laden fiber stock from said turbulence chamber back into said axial rotor region.

15. The sorting apparatus as defined in claim 14, wherein:

said deflecting surface deflects said water-laden fiber stock in a predetermined direction of movement; and said deflecting surface being domed in said predetermined direction of movement of the water-laden fiber stock.

16. The sorting apparatus as defined in claim 15, further including:

guide ribs for the fiber stock provided at said deflecting surface.

17. The sorting apparatus as defined in claim 13, wherein:

said rotor defines an ejection side and an axial direction;

adjustable guide ribs arranged at the housing on the ejection side of said rotor; and said guide ribs effecting a movement of the water-laden fiber stock in said axial direction of the rotor.

18. The sorting apparatus as defined in claim 13, wherein:

said means for flushing-in water at least in the direction extending into said turbulence chamber contain water outlet openings distributively arranged in a lengthwise spaced relationship at the housing.

19. The sorting apparatus as defined in claim 13, wherein:

said shaft of said rotor defines a hollow shaft;

infeed means for water with which said hollow shaft of said rotor is connected;

said hollow shaft being provided with outlet openings for the water; and said hollow shaft and said infeed means conjointly constituting said means for flushing-in water.

20. The sorting apparatus as defined in claim 13, wherein:

said axis of the housing is substantially horizontally disposed.

21. The sorting apparatus as defined in claim 13, wherein:

said axis of the housing is inclined.

22. The sorting apparatus as defined in claim 13, further including:

an infeed vat containing an overflow edge means provided at said housing;

said infeed vat being arranged above said housing containing said rotor;

said rotor having a rotor axis; and said infeed vat extending substantially parallel to said rotor axis.

23. The sorting apparatus as defined in claim 22, wherein:

said infeed vat extends through a distance amounting to more than one-half of the axial extent of said housing.

24. A sorting apparatus for sorting fiber stock, especially for the fabrication of paper, comprising:

a housing having an axis;

infeed means for infeeding into said housing a water-containing suspension of said fiber stock;

a screen provided for said housing;

a rotor arranged within said housing and defining a surface of revolution;

said rotor being provided with at least one blade which coactingly cooperates with said screen;

said housing together with said screen defining a vat having a lower region;

said screen forming a partial surface of a body of revolution which defines an axis, and said screen being arranged at said lower region of said vat;

said rotor being provided with a shaft at the region of said axis of said body of revolution;

a catchbox for passed good stock and water situated beneath said screen;

said at least one blade of said rotor extending in close proximity to said screen and serving for clearing said screen of water-laden fiber stock located thereon;

said housing being provided with an air space forming a turbulence chamber located externally of the surface of revolution defined by the rotor;

said rotor propelling said water-laden fiber stock into said turbulence chamber and thereby intensively agitating said water-laden fiber stock;

means for flushing-in water at least in a direction extending into said chamber and which means extend along said screen;

at least one additional blade provided for said rotor which is shorter than said at least one blade for clearing of the screen; and said at least one additional shorter blade serving for propelling the water-laden fiber stock.

25. The sorting apparatus as defined in claim 24, wherein:

said rotor defines an axis; and said at least one blade and at least one additional blade being positioned substantially parallel to said rotor axis.

26. The sorting apparatus as defined in claim 24, wherein:

said rotor defines an axis; and at least one of said at least one blade and at least one additional blade being inclined with respect to said rotor axis such that it effectuates a movement of the water-laden fiber stock in axial direction of the rotor.

27. A sorting apparatus for sorting fiber stock, especially for the fabrication of paper, comprising:
a housing having an axis;
infeed means for infeeding into said housing a water-containing suspension of said fiber stock;
a screen provided for said housing;
a rotor arranged within said housing and defining a surface of revolution;
said rotor being provided with at least one blade which coactingly cooperates with said screen;
said housing together with said screen defining a vat having a lower region;
said screen forming a partial surface of a body of revolution which defines an axis, and said screen being arranged at said lower region of said vat;
said rotor being provided with a shaft at the region of said axis of said body of revolution;
a catchbox for passed good stock and water situated beneath said screen;
said at least one blade of said rotor extending in close proximity to said screen and serving for clearing said screen of water-laden fiber stock located thereon;
said housing being provided with an air space forming a turbulence chamber located externally of the surface of revolution defined by the rotor;
said rotor propelling said water-laden fiber stock into said turbulence chamber and thereby intensively agitating said water-laden fiber stock;
means for flushing-in water at least in a direction extending into said chamber and which means extend along said screen;
said rotor having a lengthwise axis;
a further rotor having a lengthwise axis and arranged within said housing in said turbulence chamber; and
said lengthwise axis of said further rotor extending substantially parallel to the lengthwise axis of the first-mentioned rotor.

28. A sorting apparatus for sorting an aqueous fiber stock suspension containing contaminants and intended for fabricating paper, especially a fiber stock suspension comprising fibers and reclaimed from waste paper and containing substantially flat contaminants such as plastic foils, comprising:
a housing;
infeed means for infeeding said aqueous fiber stock suspension into said housing;
said housing containing a screen;
a rotor operatively associated with said screen;
said rotor comprising a predetermined number of blades and thereby defining a surface of revolution of said rotor;
said blades being arranged to move along said screen;
said housing having the form of a trough;
said trough having a lower region;
said screen at least partially defining a surface of revolution;
said surface of revolution having a predetermined axis disposed in a desired orientation;
said surface of revolution defined at least partially by said screen being arranged in said lower region of said trough;
a catchbox receiving good stock and water from said infed aqueous fiber stock suspension and situated beneath said screen;
said rotor having a shaft;
said shaft being arranged in the region of said predetermined axis of said surface of revolution at least partially defined by said screen;
at least one blade of said predetermined number of blades extending into the proximity of said screen;
said at least one blade being structured for clearing said screen from water-laden fiber stock accumulated thereupon;
an air chamber situated beyond the surface of revolution defined by said rotor;
said air chamber forming a turbulence chamber;
said rotor, during operation of the sorting apparatus, propelling said water-laden fiber stock and said substantially flat contaminants in an essentially uncomminuted state into said turbulence chamber and thereby agitating said water-laden fiber stock without comminuting said substantially flat contaminants; and
means for flushing-in water at least in a direction extending into said turbulence chamber and which means extend along said screen.

29. A sorting apparatus for sorting fiber stock, especially for the fabrication of paper, comprising:
a housing;
a screen assuming the shape of at least part of a surface of revolution about a predetermined axis;
said screen being mounted at said housing and forming conjointly therewith a substantially trough-shaped housing;
infeed means for infeeding said fiber stock toward said screen;
a rotor extending coaxially with said screen;
said rotor containing a predetermined number of clearing blades extending close to said screen and a predetermined number of propelling blades terminating at a predetermined distance farther away from said screen;
said clearing blades of said rotor defining, during rotation of said rotor, a surface of revolution of said rotor;
said housing containing an air space which constitutes a turbulence chamber and which is located outside said surface of revolution defined by said clearing blades of said rotor;
said clearing blades, during rotation of said rotor and in the presence of infed fiber stock, clearing said screen of fiber stock accumulated thereupon and propelling said fiber stock from said screen into said turbulence chamber;
said propelling blades, during said rotation of said rotor, receiving fiber stock from said turbulence chamber and propelling said received fiber stock at a relatively steep angle against said screen;
means for moving said fiber stock along said screen;
a catchbox located beneath said screen and receiving good stock passed through said screen; and
discharge means receiving and discharging overflow stock held back by and moved along said screen.

30. The apparatus as defined in claim 29, wherein:
said predetermined number of clearing blades and said predetermined number of propelling blades at said rotor each form related blade groups;
said rotor possessing an axis and a predetermined number of sections each of which contains one blade group of said clearing blades and said propelling blades;
said blade groups associated with different sections of said rotor being mutually offset; and partitions arranged between said sections of said rotor and extending substantially perpendicular to said rotor axis.

31. The apparatus as defined in claim 29, wherein: said infeed means infeed fiber stock reclaimed from waste paper and containing substantially flat contaminants, especially pieces of plastic foil; and
said overflow stock constituting said substantially flat contaminants in an essentially uncomminuted state.

* * * * *